US012500366B2

(12) United States Patent
Raab et al.

(10) Patent No.: US 12,500,366 B2
(45) Date of Patent: Dec. 16, 2025

(54) ELECTRICAL PLUG CONNECTOR AND METHOD FOR ASSEMBLING AN ELECTRICAL PLUG CONNECTOR

(71) Applicant: TE Connectivity Germany GmbH, Bensheim (DE)

(72) Inventors: Stefan Raab, Woert (DE); Andre Mairoser, Woert (DE); Harald Kraenzlein, Woert (DE); Andreas Oettle, Woert (DE); Alexander Rudi, Woert (DE)

(73) Assignee: TE Connectivity Germany GmbH, Bensheim (DE)

( * ) Notice: Subject to any disclaimer, the term of this patent is extended or adjusted under 35 U.S.C. 154(b) by 343 days.

(21) Appl. No.: 18/068,840

(22) Filed: Dec. 20, 2022

(65) Prior Publication Data

US 2023/0198187 A1 Jun. 22, 2023

(30) Foreign Application Priority Data

Dec. 22, 2021 (DE) ......................... 102021134299.6

(51) Int. Cl.
*H01R 13/426* (2006.01)
*H01R 13/11* (2006.01)
*H01R 43/20* (2006.01)

(52) U.S. Cl.
CPC ......... *H01R 13/426* (2013.01); *H01R 13/111* (2013.01); *H01R 43/20* (2013.01)

(58) Field of Classification Search
CPC .. H01R 13/424; H01R 13/426; H01R 13/434; H01R 13/436; H01R 13/4367; H01R 13/4368; H01R 13/521
See application file for complete search history.

(56) References Cited

U.S. PATENT DOCUMENTS 7,318,755 B2 1/2008 Sauer
10,276,959 B2 4/2019 Lehner et al.
(Continued)

FOREIGN PATENT DOCUMENTS

CN 105075018 A 11/2015
CN 107210543 A 9/2017
(Continued)

OTHER PUBLICATIONS

German Office Action, Application No. 10 2021 134 299.6, Dated: Aug. 26, 2022, 6 pages.
(Continued)

*Primary Examiner* — Ross N Gushi
(74) *Attorney, Agent, or Firm* — Barley Snyder

(57) ABSTRACT

A connector includes a housing defining a first receiving space and a second receiving space, a conductive electrical connecting element arranged in the second receiving space, a retaining element engaging around at least portions of the electrical connecting element and a contact-securing insert arranged in the first receiving space. The conductive electrical connecting element includes a contact sleeve adapted to connect to a contact pin, and an electrical contact adapted to connect to an electrical conductor. The contact-securing insert fixing the electrical connecting element and the retaining element within the housing in an axial direction of the electrical connecting element.

21 Claims, 10 Drawing Sheets

(56) References Cited

U.S. PATENT DOCUMENTS

| | | | | |
|---|---|---|---|---|
| 10,424,891 | B2 | 9/2019 | Tonoike et al. | |
| 10,498,067 | B2 * | 12/2019 | Gilbert | G02B 6/3878 |
| 11,569,622 | B2 | 1/2023 | Dobler | |
| 2004/0110427 | A1 | 6/2004 | Shi et al. | |
| 2013/0330952 | A1 | 12/2013 | Mori | |
| 2020/0295502 | A1 | 9/2020 | Tanaka | |
| 2022/0077628 | A1 * | 3/2022 | Roewekaemper | H01R 13/4367 |
| 2022/0181812 | A1 | 6/2022 | Hibino et al. | |

FOREIGN PATENT DOCUMENTS

| | | | |
|---|---|---|---|
| CN | 108933354 | A | 12/2018 |
| CN | 112803209 | A | 5/2021 |
| DE | 112020001980 | T5 | 1/2022 |
| GB | 2081526 | A | 2/1982 |
| JP | S5592282 | U | 6/1980 |
| JP | 2015103376 | A | 6/2015 |
| KR | 101448785 | B1 | 10/2014 |
| WO | 2004054044 | A1 | 6/2004 |
| WO | 2007128152 | A2 | 11/2007 |
| WO | 2020200562 | A1 | 10/2020 |

OTHER PUBLICATIONS

Japanese Office Action dated Jan. 16, 2024 with English translation, corresponding to Application No. 2022-201811, 7 pages.

Chinese Office Action dated Nov. 7, 2025, corresponding to Application No. 202211630306.6, 8 pages.

* cited by examiner

ELECTRICAL PLUG CONNECTOR AND METHOD FOR ASSEMBLING AN ELECTRICAL PLUG CONNECTOR

CROSS-REFERENCE TO RELATED APPLICATIONS

This application claims the benefit of German Patent Application No. DE 102021134299.6, filed on Dec. 22, 2021, the whole disclosure of which is incorporated herein by reference.

FIELD OF THE INVENTION

The present invention relates to an electrical plug connector and a method for assembling an electrical plug connector.

BACKGROUND

Prior art electrical plug connectors of which the assembly involves inserting a terminal into a housing, typically require a specific azimuthal or rotational orientation of the terminal during the insertion process. Achieving this orientation can be difficult and time consuming, and further, often results in damage to the terminals and/or wires associated therewith. Accordingly, an improved electrical plug connector and an improved method for assembling an electrical plug connector is desired.

SUMMARY

According to an embodiment of the present disclosure, a connector includes a housing defining a first receiving space and a second receiving space, a conductive electrical connecting element arranged in the second receiving space, a retaining element engaging around at least portions of the electrical connecting element and a contact-securing insert arranged in the first receiving space. The conductive electrical connecting element includes a contact sleeve adapted to connect to a contact pin, and an electrical contact adapted to connect to an electrical conductor. The contact-securing insert fixing the electrical connecting element and the retaining element within the housing in an axial direction of the electrical connecting element.

BRIEF DESCRIPTION OF THE DRAWINGS

The invention will now be described by way of example with reference to the accompanying Figures, of which.

DETAILED DESCRIPTION OF THE EMBODIMENTS

Figure 1:
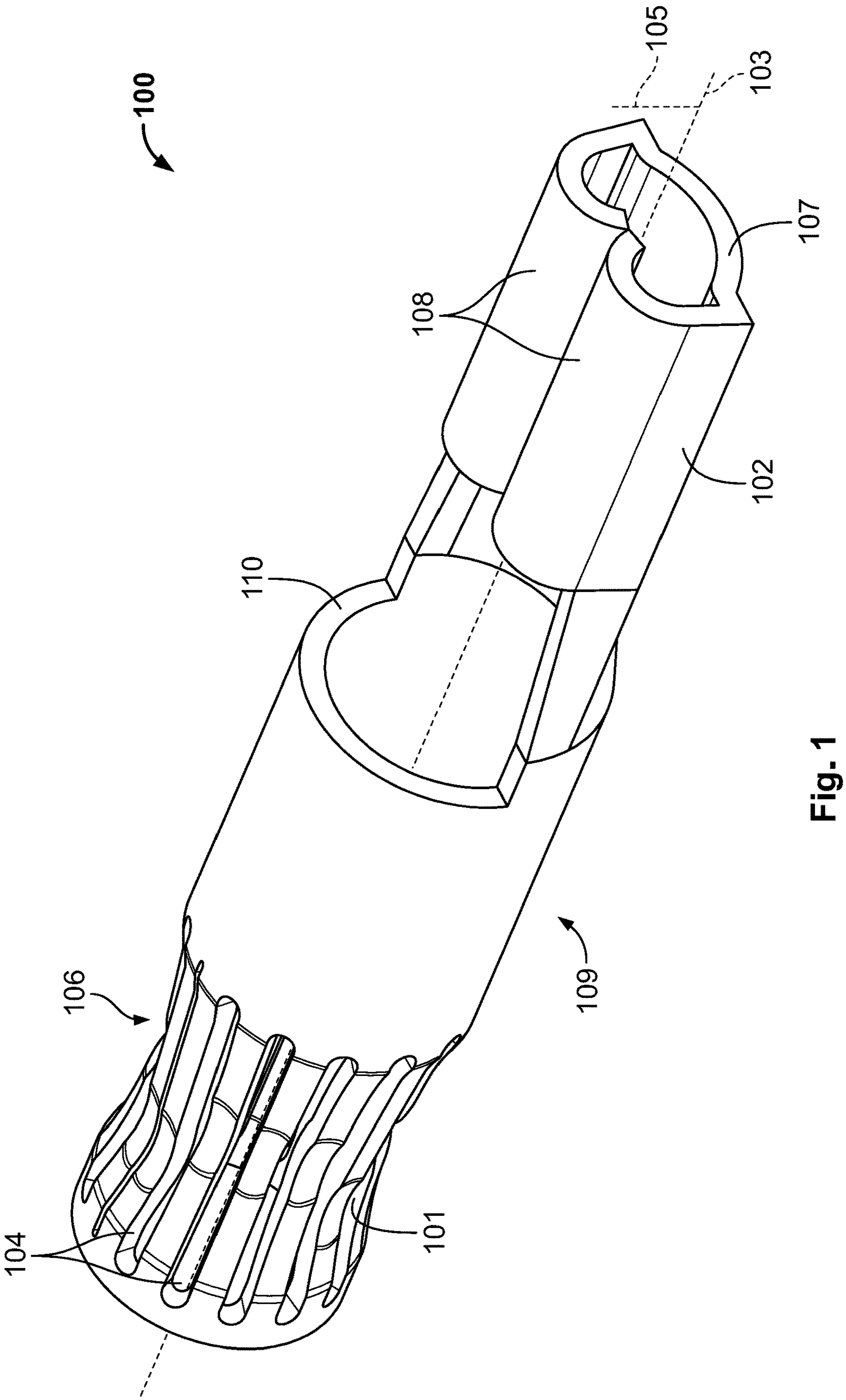
FIG. 1 shows an electrical connecting element of an electrical plug connector in a perspective view.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 schematically shows an electrical connecting element 100 of an electrical plug connector in a perspective view. The electrical connecting element 100 has a contact sleeve 101 for connecting the electrical connecting element to a contact pin, and an electrical contact 102 for connecting the electrical connecting element to an electrical conductor. The contact sleeve 101 and the electrical contact 102 are arranged on opposite longitudinal ends of the electrical connecting element 100 in an axial direction 103 of the electrical connecting element 100.

The contact sleeve 101 has slots 104 along the axial direction 103. The slots 104 allow the contact sleeve 101 to be flexible along radial direction, e.g., a radial direction 105. This can be advantageous when receiving a contact pin. However, the slots 104 can also be omitted. By way of example, the contact sleeve 101 has a narrowed portion 106. Inside the narrowed portion 106, the contact sleeve 101 has a smaller radius than outside the narrowed portion. This can improve the stability of a connection with a contact pin.

The electrical contact 102 of the electrical connecting element 100 is formed by way of example as a crimp contact, in the present example as a so-called B-crimp contact. The electrical contact 101 formed as a B-crimp contact has a crimp contact base 107 and crimp flanks 108. An electrical conductor can be crimped between the crimp contact base 107 and the crimp flanks 108. In the crimped state, the crimp flanks 108 face each other and form the B-shaped crimp contact with the crimp contact base 107. The electrical conductor is not shown in FIG. 1 for the sake of clarity. The electrical contact 102 does not necessarily have to be formed as a crimp contact. The electrical connecting element 100 has a transition portion 109. In the transition portion 109, the contact sleeve 101 is connected to the electrical contact 102. The contact sleeve 101 has an edge 110 facing the electrical contact 102. The electrical connecting element 100 may be formed from a copper alloy by way of example. The electrical connecting element 100 can also comprise another electrically conductive material.

The electrical connecting element 100 can, for example, be produced from a sheet of metal by means of a stamping process.

Figure 2:
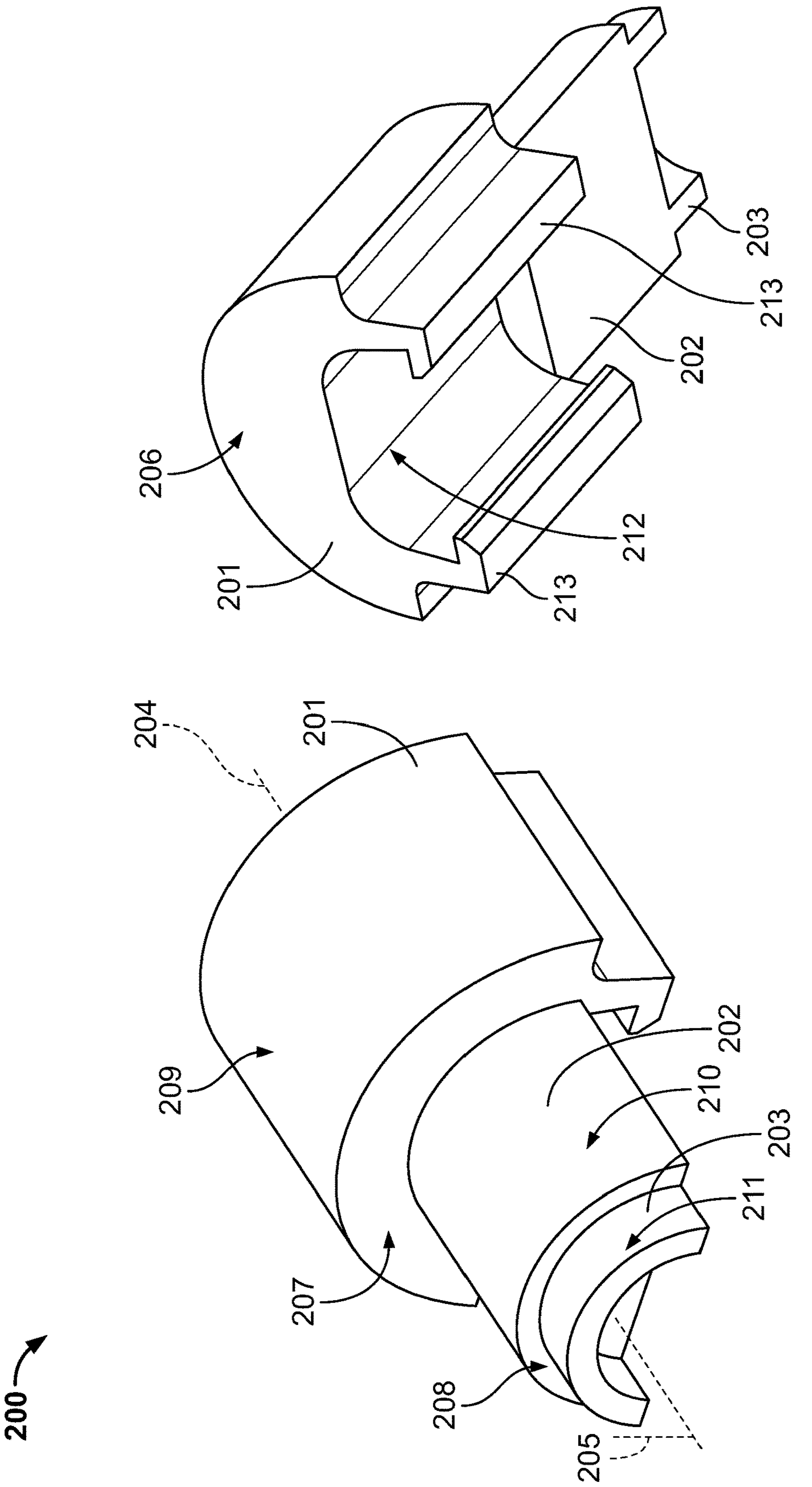
FIG. 2 shows a retaining element of the electrical plug connector in two different perspective views.

FIG. 2 schematically shows a retaining element 200 of the electrical plug connector in two different perspective views. The retaining element 200 can be plugged together with the electrical connecting element 101. The retaining element 200 may be made of a plastics material. The retaining element 200 has a first stop portion 201 and a second stop portion 202. Further, the retaining element 202 has an engagement portion 203.

The first stop portion 201 is substantially semi-cylindrical. The second stop portion 202 is semi-cylindrical. The engagement portion 203 is in the form of a semi-cylinder shell. A radius of the first stop portion 201 dimensioned in a radial direction 205 is larger than a radius of the second stop portion 202. The radius of the second stop portion 202 is larger than a radius of the engagement portion 203. The first stop portion 201, the second stop portion 202, and the engagement portion 203 are arranged in series along an axial direction 204 of the retaining element 200. As a result, the retaining element 200 is telescopic.

On a side facing away from the second stop portion 202 and the engagement portion 203, the first stop portion 201 of the retaining element 200 has a first stop surface 206. On a side facing the second stop portion 202 and the engagement portion 203, the first stop portion 201 of the retaining element 200 has a second stop surface 207. On a side facing away from the first stop portion 201 and facing the engagement portion 203, the second stop portion 203 of the retaining element 200 has a third stop surface 208. The first stop portion 201 has a first outer wall 209. The second stop portion 202 has a second outer wall 210. The engagement portion 203 has a third outer wall 211.

The first stop portion 201 has a receiving portion 212 for receiving the electrical connecting element 100. In particular, the receiving portion 212 can be provided for receiving the electrical contact 102. Furthermore, the first stop portion 201 of the retaining element 200 has latching hooks 213 arranged on opposite sides of the retaining element in the radial direction 205 and projecting in a common half-plane. The latching hooks 213 are arranged on a side opposite the first outer wall 209. In the plugged together state of the electrical connecting element 100 with the retaining element 200, the electrical connecting element is arranged in the receiving portion 212 of the retaining element and is embraced or captured in portions by the latching hooks 213.

Figure 3:
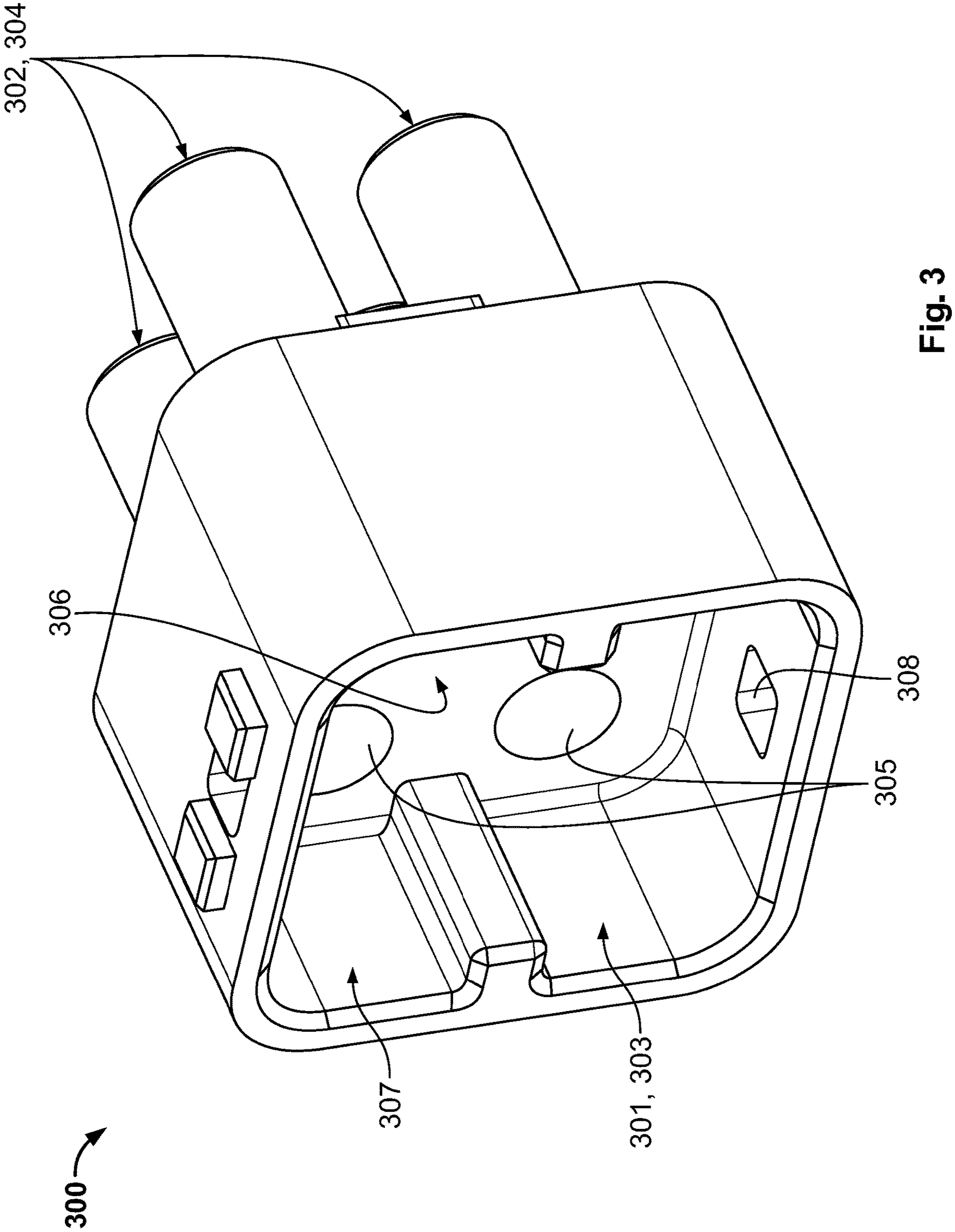
FIG. 3 shows a housing of the electrical plug connector in a perspective view.

FIG. 3 schematically shows a housing 300 of an electrical plug connector in a perspective view. The housing 300 comprises a plastics material by way of example, such as a polyphthalamide (PPA). The housing 300 has a first receiving space 301 for receiving the contact-securing insert and a total of four second receiving spaces 302, by way of example, each for receiving an electrical connecting element 100 as shown in FIG. 1. The first receiving space 301 is accessible via a first opening 303 in the housing 300. The second receiving spaces 302 are each accessible via a second opening 304 in the housing 300. The first opening 303 and the second openings 304 are formed on opposite sides of the housing 300. The second receiving spaces 302 are accessible via the first receiving space 301 through third openings 305 formed between the first receiving space and the second receiving spaces, respectively. A first stop 306 is formed between the first receiving space 301 and the second receiving spaces 302. By way of example, the housing 300 has only four second receiving spaces 302. However, it is sufficient if the housing 300 has at least one second receiving space 302. In this case, only a third opening 305 is formed between the first receiving space 301 and the second receiving space 302.

In the first receiving space 301 of the housing 300, first latching structures 308 are arranged on an inner side 307 of the housing 300. The first latching structures 308 are provided for receiving first latching lugs of the contact-securing insert, which will be explained in greater detail in the following description. This allows the contact-securing insert to latch in the first receiving space 301. The first receptacle 301 has a substantially cuboid shape with rounded edges, by way of example. The second receiving spaces 302 each have cylindrical shapes, for example. However, the shapes of the first receiving space 301 and the second receiving spaces 302 can also be different.

Figure 4:
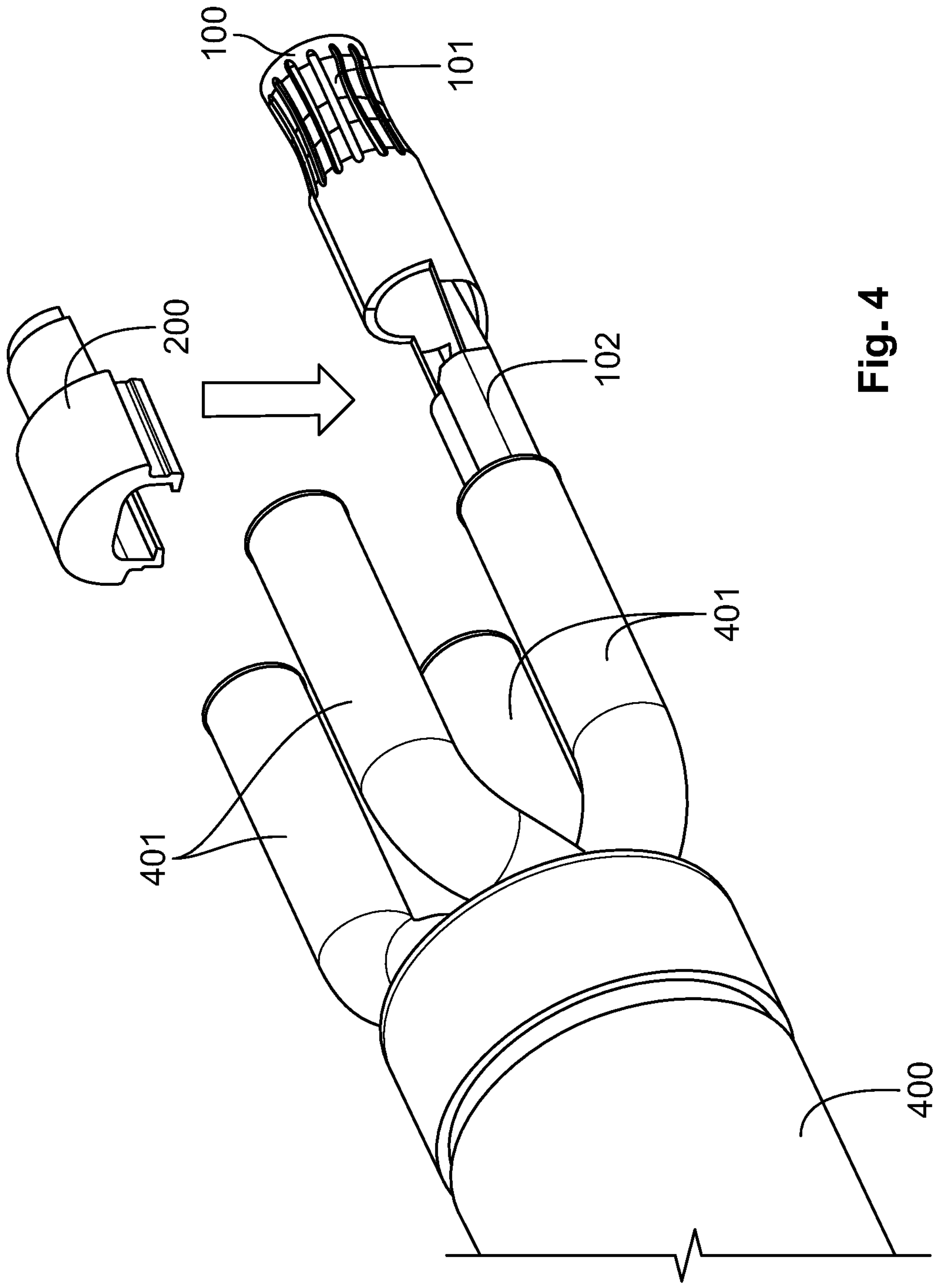
FIG. 4 shows first method steps of a method for assembling the electrical plug connector.

FIG. 4 schematically shows the first method steps of a method for assembling the electrical plug connector. Reference signs of previously explained elements of the electrical plug connector are retained. In a first method step, the electrical contact 102 of the electrical connecting element 100 is connected to an electrical conductor 401. Because the electrical contact 102 is formed as a crimp contact, the electrical conductor 401 is crimped with the crimp contact.

The electrical conductor 401 is part of a cable 400. The cable 400 has, by way of example, a total of four electrical conductors 401 which are electrically insulated from one another. However, the cable 400 comprises at least one electrical conductor 401. Each electrical conductor 401 of the cable 400 is connected to its own electrical connecting element 100 by connecting or crimping the electrical contact 102 of an electrical connecting element 100 to an electrical conductor 401. In FIG. 4, the first method step is only shown for one electrical conductor for the sake of clarity.

Figure 5:
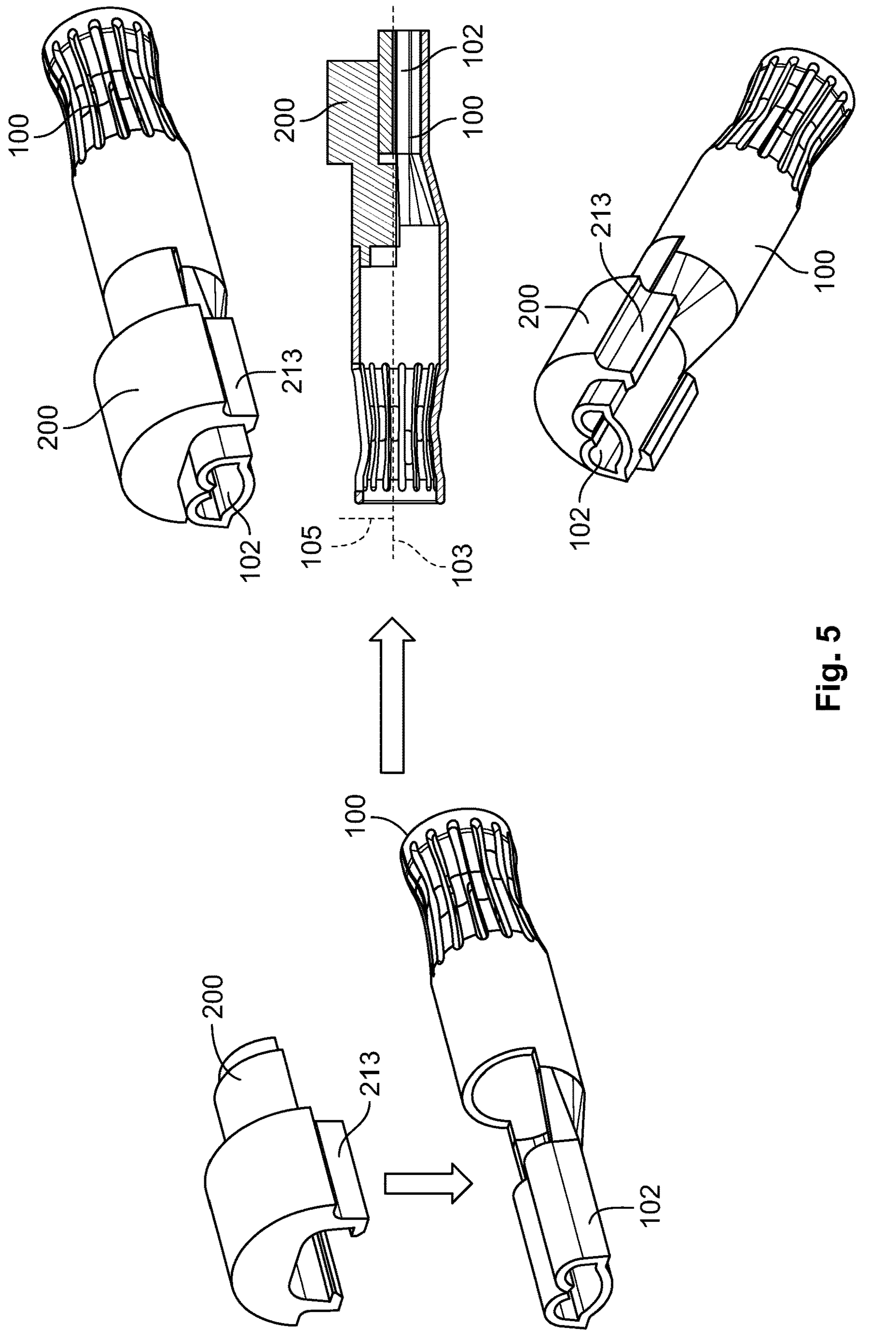
FIG. 5 shows a plugging together of the electrical connecting element and the retaining element.

In a second method step, the retaining element 200 is plugged together with the electrical connecting element 100 in such a way that the retaining element surrounds the electrical connecting element at least in portions. One retaining element 200 is provided for each electrical connecting element. FIG. 5 illustrates the plugging together of the electrical connecting element 100 of FIG. 1 and of the retaining element 200 of FIG. 2. Reference is made additionally to FIG. 1 and FIG. 2 and the associated description. The electrical conductor 401 connected to the electrical contact 102 is not shown in FIG. 5 for the sake of clarity.

The retaining element 200 is plugged together with the electrical connecting element 100 in such a way that the electrical contact 102 is arranged in the receiving portion 212 of the first stop portion 201 and is engaged around by the latching hooks 213. The retaining element 200 can be fixed to the electrical connecting element 100 in such a way that the retaining element 200 cannot be displaced in the axial direction 103 of the electrical connecting element 100.

The retaining element 200 can be plugged together with the electrical connecting element 100 in a transition region between the electrical contact 102 and the contact sleeve 101 in such a way that the retaining element abuts the edge 110 of the contact sleeve, whereby the retaining element is fixed to the electrical connecting element in the axial direction 103. In the assembled state, the retaining element 200 rests with the third stop surface 208 of the second stop portion 202 against the edge 110 of the contact sleeve 101. The retaining element 200 can also be plugged together with the electrical connecting element 100 in such a way that it engages in the contact sleeve 101, whereby the retaining element is fixed to the electrical connecting element in the radial direction 105. In the plugged together state, the engagement portion 203 of the retaining element 200 projects into the contact sleeve 101. The third outer wall 211 of the engagement portion 203 abuts an inner wall of the contact sleeve.

Figure 6:
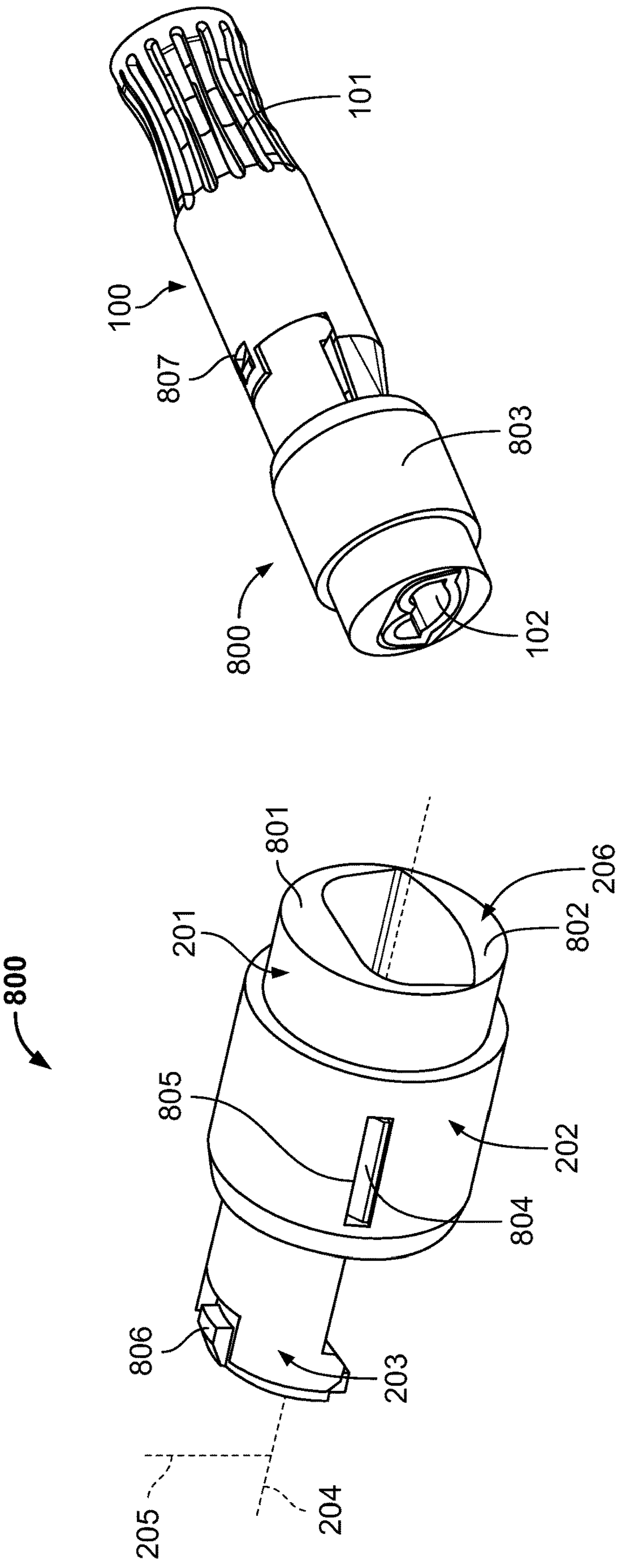
FIG. 6 shows a retaining element according to a further embodiment and the further retaining element in a state plugged together with the electrical connecting element, in each case in a perspective view.

FIG. 6 shows another retaining element 800 according to a further embodiment in a state plugged together with the electrical connecting element 100, in each case in a perspective view. The retaining element 200 of FIG. 2 and the further retaining element 800 of FIG. 6 have similarities. Only the differences between the retaining elements 200, 800 are explained herein.

The retaining element 800 differs from the retaining element 200 in that it is configured to completely surround the electrical contact 102 of the electrical connecting element 100. The retaining element 800 has a first portion 801 and a second portion 802, which are connected to one another via a living hinge 803, which extends in the axial direction 204. Thus, the further retaining element 800 is formed in one piece. The first portion 801 has a second latching structure 205. The second portion 802 has a second latching lug 804 for engaging the second detent structure 805. The second latching lug 804 and the second latching structure 805, additionally to the living hinge 803, also allow the first portion 801 and the second portion 802 of the retaining element 800 to be connected together. In the interconnected state of the portions 801, 802, the second latching lug 804 and the second latching structure 805 are arranged on a side opposite the living hinge 803 in the radial direction 205. Instead of a living hinge 803, the retaining element 800 can also comprise a further second latching nose and a further second latching structure. In this case, the retaining element 800 is formed in two pieces. The latching hooks 213 are omitted from the retaining element 800.

The engagement portion 203 of the retaining element 800 has a third latching lug 806. The third latching lug 806 is configured to engage a third latching structure 807 of the electrical connecting element 100 formed in the contact sleeve 101 of the electrical connecting element 100. As a result, the retaining element 800 is fixed to the electrical connecting element 100 in the axial direction 204. However, the third latching lug 806 and the third latching structure 807 can also be omitted.

The retaining element 200 and the retaining element 800 can each be plugged together with the electrical connecting element 100 at least partially mechanically, i.e., in an automated manner. The retaining element 200 and the retaining element 800 can be fed to the electrical connecting element 100, in each case as individual parts or in a state in which they are plugged together with a carrier, and can be provided for plugging together.

Figure 7:
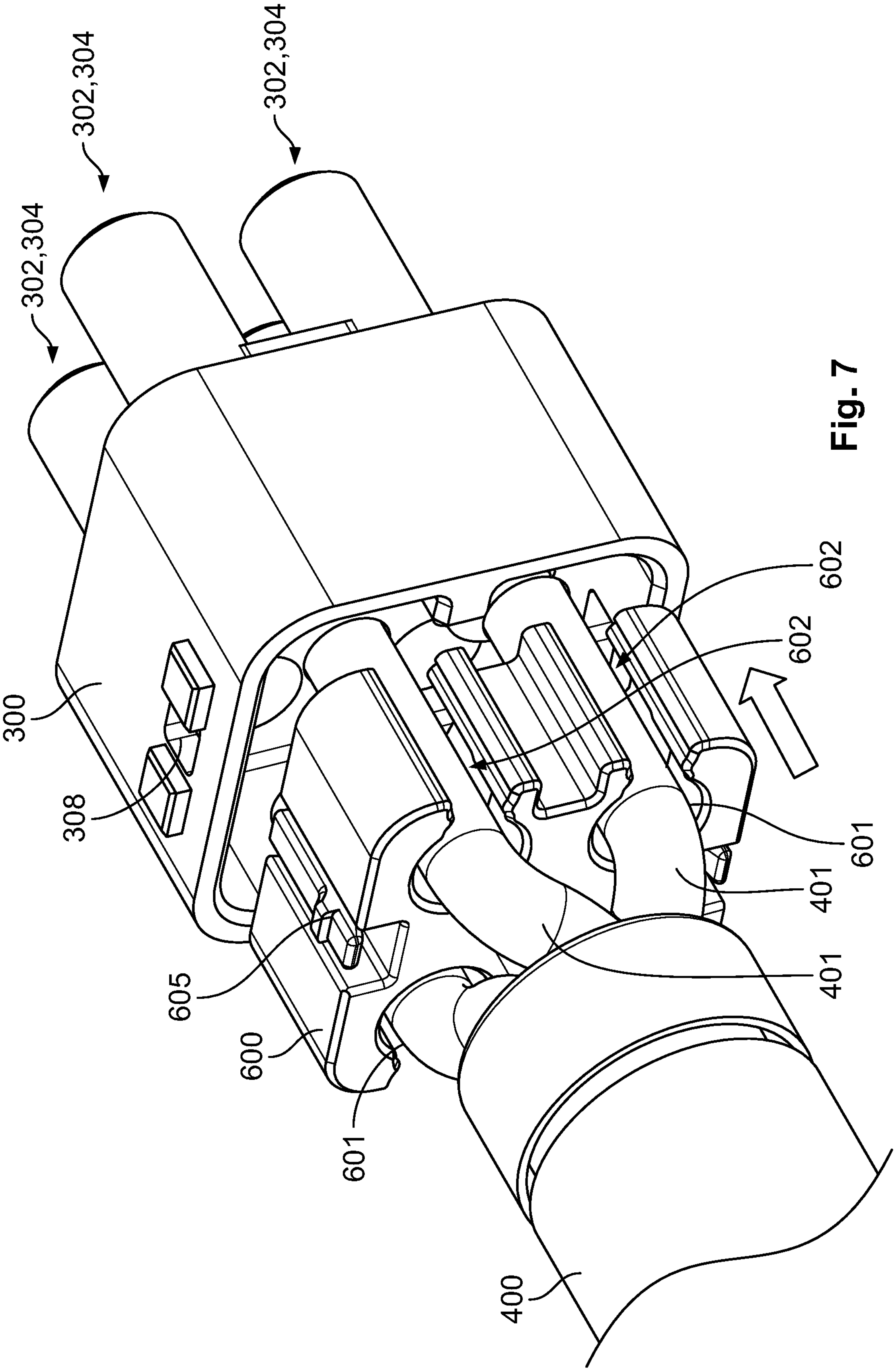
FIG. 7 shows further method steps of the method for assembling the electrical plug connector.

FIG. 7 schematically shows further method steps of the method for assembling the electrical plug connector. In addition to the components of the electrical plug connector explained so far, namely the electrical connecting element 100, the retaining element 200, the housing 300 and the cable 400. A contact-securing insert 600 is also used in the third method step. The connecting element 100 and the retaining element 200 are already installed in the housing 300 in the figure.

The contact-securing insert 600 is provided for insertion into the first receiving space 301 of the housing. The contact-securing insert 600 comprises a plastics material by way of example. The contact-securing insert 600 has, by way of example, a total of four through-openings 601. Each through-opening 601 is provided for an electrical conductor 401 of the cable 400. If the cable 400 has only one electrical conductor 401, it is sufficient if the contact-securing insert 600 has only one through-opening 601. In this case, only one electrical connecting element 100 and only one retaining element 200 are used, and the housing 300 expediently has only one second receiving space 302. The through-openings 601 are each accessible via a groove 602 running parallel to the through-opening. Each electrical conductor 401 can be arranged in a through-opening 601 of the contact-securing insert 600 as part of a third method step of the method for assembling the electrical plug connector. In each case, an electrical conductor 401 is guided laterally into the through-opening 601 via the groove 602 running parallel to the through-opening.

Subsequently, in a fourth method step, the at least one electrical connecting element 100, the retaining element 200 plugged together with the electrical connecting element 100, the electrical conductor 401 connected to the electrical contact 102 of the electrical connecting element, and the contact-securing insert 600 are inserted through the first opening 303 into the housing 300. The at least one electrical connecting element 100 is first inserted into the first receiving space 301. From the first receiving space 301, the electrical connecting element 100 is inserted into the second receiving space 302 through the third opening 305.

The insertion takes place until the contact-securing insert 600 is arranged and locked in the first receiving space 301, the electrical contact 102 is arranged in the first receiving space 301 and facing the first opening 303, and the contact sleeve 101 is arranged in the second receiving space 302 and facing the second opening 304. As a result, the electrical connecting element 100 and the retaining element 200 are fixed in the axial direction 103 in the housing 300 by the contact-securing insert 600. Due to a symmetry of the electrical connecting element 100 plugged together with the retaining element 200, the electrical connecting element is inserted into the housing 300 independently of its azimuthal orientation. The contact-securing insert has the first latching lugs 605 for latching, which can latch into the latching structures 208.

Figure 8:
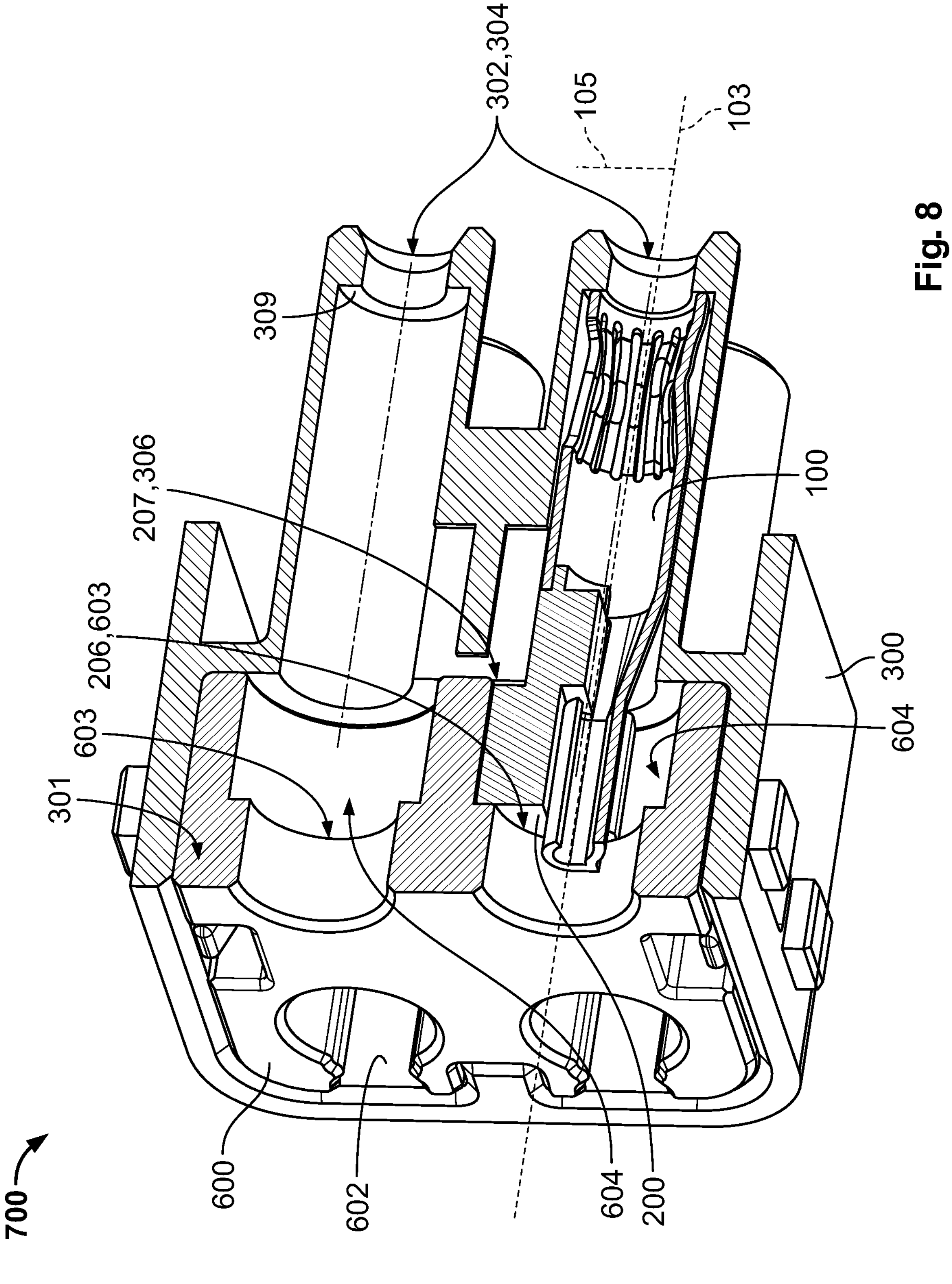
FIG. 8 shows the assembled electrical plug connector in a perspective cross-sectional view.

FIG. 8 schematically shows the electrical plug connector 700 in the assembled state in a perspective cross-sectional view, wherein the electrical conductor 401 are not shown for the sake of clarity. For the sake of simplicity, only an electrical connecting element 100 plugged together with a retaining element 200 and inserted into the housing 300 is also shown. The electrical connecting element 100 with the plugged together retaining element 200 has been inserted into the first receiving space 301 in such a way that the retaining element abuts the first stop 306 of the housing 300. As a result the electrical connecting element 100 is fixed in the axial direction 103 in the housing 300. In this case, the second stop surface 207 of the retaining element 200 abuts the first stop 306. However, it is not necessary that the retaining element 200 is inserted in abutment with the first stop 306.

The contact-securing insert 600 has a second stop 603 formed within the through-opening 601. When inserted into the housing 300, the retaining element 200 abuts the second stop 603 of the contact-securing insert 600 with the first stop surface 206, thereby fixing the electrical connecting element 100 in the housing in the axial 103 direction. However, it is not mandatory that the retaining element 200 abuts the second stop 603 in the assembled state of the electrical plug connector 700. The electrical connecting element 100 is particularly axially fixed when the retaining element 200 is in contact with both the first stop 306 and the second stop 603.

In the example shown, the retaining element 200 is shaped in such a way that, when inserted into the housing 300, the retaining element at least partially abuts an inner wall 604 of the through-opening 601 of the contact-securing insert 600. As a result the electrical connecting element 100 is fixed in the housing 300 in the radial direction 105. Here, the first outer wall 209 of the first stop portion 201 abuts the inner wall 604 of the through-opening 601. However, it is not necessary for the retaining element 200 to abut the inner wall 604 of the through-opening 601. If this is the case, however, the first stop portion 201 must have a radial cross-section which corresponds, at least in portions, to a radial cross-section of the through-opening 601. It is not necessary that the retaining element 200 has the form shown in FIG. 2. For example, it is also possible for the first stop portion 201 to have an angular form with edges, for example a shape that is triangular in radial cross-section, instead of a cylindrical form and thus a curved first outer wall 209. In this case, the through-opening 601 must have a corresponding form in radial cross-section if the retaining element 200 is to abut the inner wall.

The housing 300 further comprises a third stop 309, which is formed in the second receiving space 302 adjacently to the second opening 304. In the assembled state, the contact sleeve 102 of the electrical connecting element 100 abuts the third stop 309, by way of example, which can prevent the electrical connecting element 100 from being inserted too far.

Figure 9:
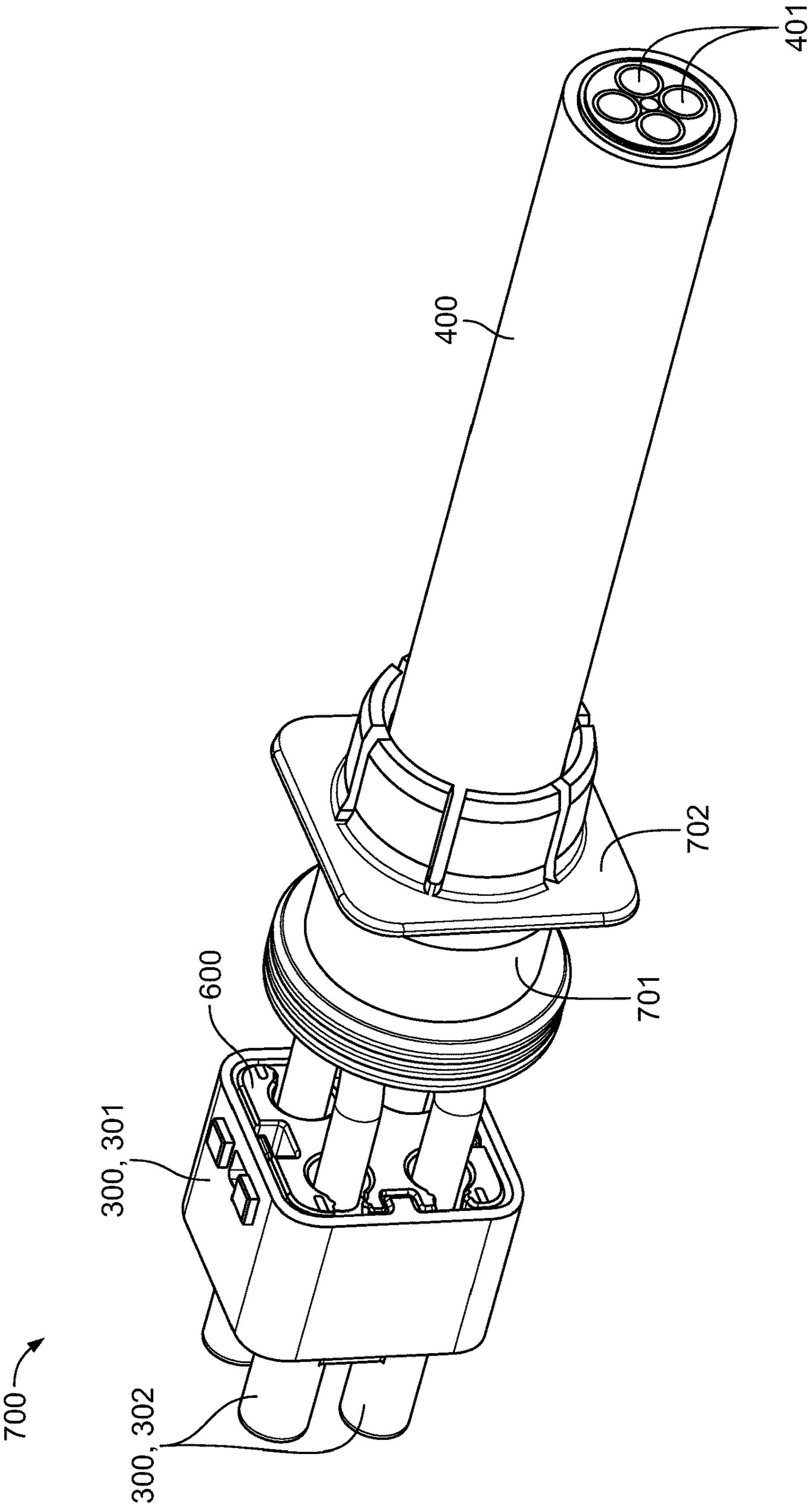
FIG. 9 shows a perspective view of the electrical plug connector of FIG. 7 with additional components.

FIG. 9 schematically shows the electrical plug connector 700 of FIG. 8 with additional optional elements in a perspective view. The electrical plug connector 700 has an optional seal 701. In the assembled state of the electrical plug connector 700 according to FIG. 8, the seal 701 can be guided over the cable 400 to the housing 300 and pressed against the housing in the region of the contact-securing insert 600, i.e., in the region of the first opening 303 of the housing. In this state, the seal 701 encloses the electrical conductors 401. Subsequently, an optional holder 702 can be guided over the cable 400 up to the seal 601. The holder 702 can be connected to both the cable 400 and the housing 300 so that the seal 701 is fixed.

Figure 10:
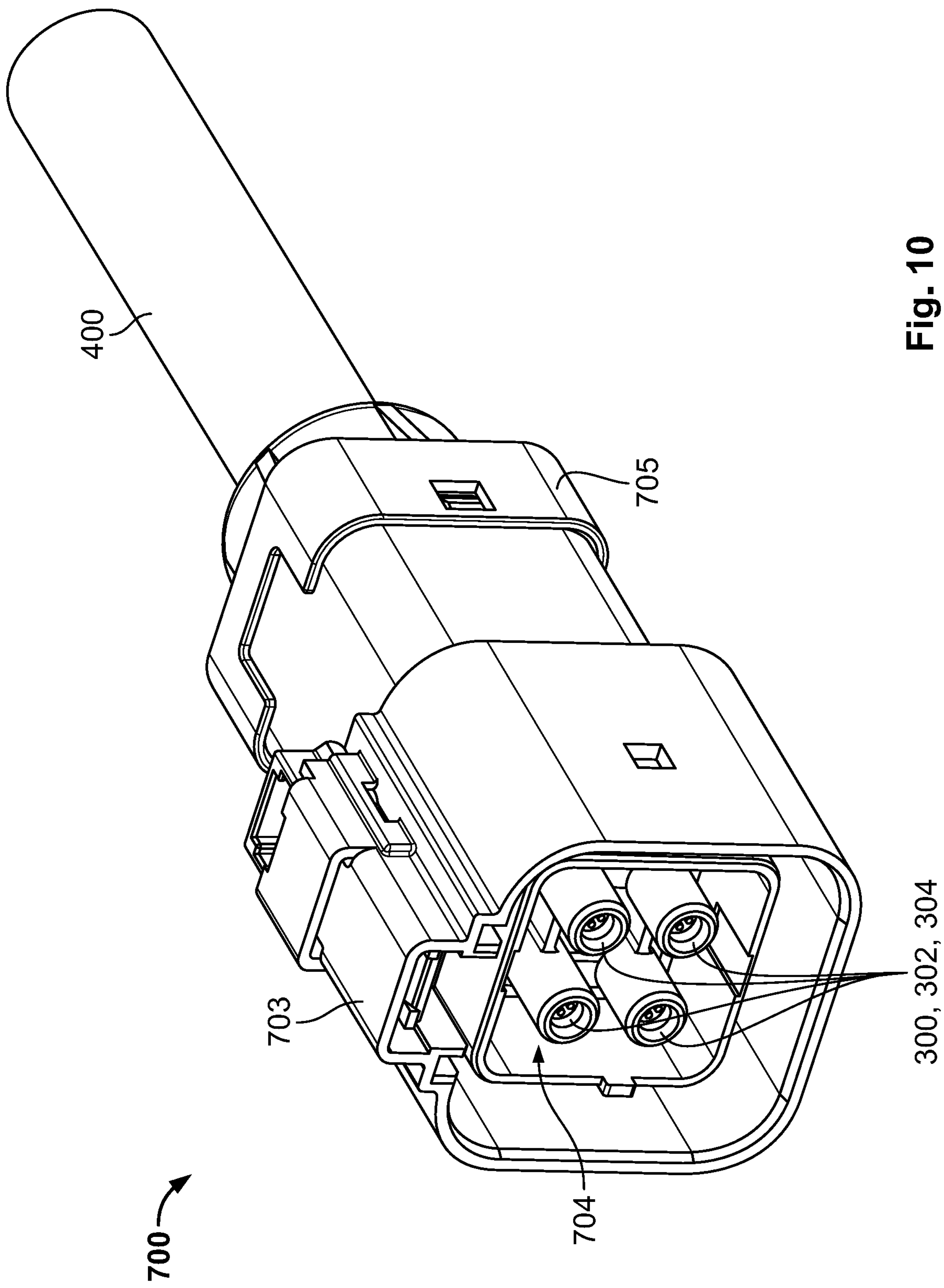
FIG. 10 shows a perspective view of the electrical plug connector of FIG. 8 with additional components.

FIG. 10 schematically shows the electrical plug connector 700 of FIG. 9 with additional optional elements in a perspective view. The electrical plug connector 700 further comprises an optional outer housing 703. The housing 300 is arranged in the outer housing 703. The outer housing 703 has a further opening 704 at which the housing 300 or the at least one second receiving space 302 or the second receiving spaces are accessible. As a result, a contact pin can be inserted through the second opening 304 into the at least one second receiving space 302 and the contact sleeve 101. If the electrical plug connector 700 is formed as a multi-core plug with, by way of example, four electrical connecting elements 100, as shown in the example illustrated, a further electrical plug connector with a total of four contact pins can be plugged into the electrical plug connector 700 in such a way that a contact pin is accommodated by a contact sleeve 101 in each case. The outer housing is double-walled in the region of the further opening 704 to accommodate the further electrical plug connector. On a side of the outer housing 703 facing away from the further opening 704, a further holder 705 can optionally be attached. The further holder 705 is intended to fix the outer housing to the cable 400.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector, comprising:

a housing defining a first receiving space and a second receiving space;

a conductive electrical connecting element arranged in the second receiving space, including:

a contact sleeve adapted to connect to a contact pin; and an electrical contact adapted to connect to an electrical conductor;

a retaining element engaging around at least portions of the electrical connecting element; and a contact-securing insert arranged in the first receiving space and fixing the electrical connecting element and the retaining element within the housing in an axial direction of the electrical connecting element, the retaining element at least partially abuts an inner wall of a through-opening of the contact-securing insert.

2. The connector of claim 1, wherein the contact sleeve and the electrical contact are arranged on opposite longitudinal ends of the electrical connecting element in the axial direction.

3. The connector of claim 1, wherein the first receiving space is accessible via a first opening in the housing and the second receiving space is accessible via a second opening in the housing, the first opening and the second opening formed on opposite sides of the housing.

4. The connector of claim 3, wherein the second receiving space is accessible through the first receiving space via a third opening formed therebetween.

5. The connector of claim 1, wherein the electrical contact is arranged within the first receiving space and faces the first opening, and the contact sleeve is arranged in the second receiving space and faces the second opening.

6. The connector of claim 1, wherein the contact-securing insert is fixedly secured within the first receiving space via a latch.

7. The connector of claim 6, wherein the electrical connecting element, the contact-securing insert and the electrical conductor are insertable into the first receiving space irrespective of a radial orientation of the electrical connecting element, the radial orientation of the electrical connecting element being fixed with the contact-securing insert arranged and latched in the first receiving space.

8. The connector according to claim 1, wherein the housing defines a first stop formed between the first receiving space and the second receiving space.

9. The connector according to claim 8, wherein the retaining element abuts the first stop and fixes the electrical connecting element within the housing in the axial direction.

10. The connector of claim 8, wherein the contact-securing insert defines a through-opening accessible through a groove formed through the insert and extending parallel with the through opening.

11. The connector according to claim 10, wherein the contact-securing insert defines a second stop formed inside the through-opening, the retaining element abutting the second stop and fixing the electrical connecting element within the housing in the axial direction.

12. The connector according to claim 10, wherein the retaining element is fixable to the electrical connecting element such that the retaining element cannot be displaced in the axial direction of the electrical connecting element.

13. The connector according to claim 1, wherein the retaining element is pluggable together with the electrical connecting element in a transition region between the electrical contact and the contact sleeve in such a way that the retaining element abuts an edge of the contact sleeve, whereby the retaining element is fixed to the electrical connecting element in the axial direction.

14. The connector according to claim 1, wherein the retaining element is pluggable together with the electrical connecting element in a transition region between the electrical contact and the contact sleeve in such a way that the retaining element engages in the contact sleeve, whereby the retaining element is fixed to the electrical connecting element in a radial direction.

15. The connector according to claim 14, wherein the electrical connecting element is fixed in the housing in the radial direction when the retaining element at least partially abuts the inner wall of the through-opening of the contact-securing insert.

16. The connector according to claim 1, wherein the housing has a first latching structure on an inner side of the first receiving space and latching to the contact-securing insert.

17. A connector, comprising:

a housing defining a first receiving space and a second receiving space;

a conductive electrical connecting element arranged in the second receiving space, including:

a retaining element engaging around at least portions of the electrical connecting element; and a contact-securing insert arranged in the first receiving space and fixing the electrical connecting element and the retaining element within the housing in an axial direction of the electrical connecting element and at a radial orientation within the housing, the retaining element at least partially abuts an inner wall of a through-opening of the contact-securing insert.

18. The connector of claim 17, wherein the electrical connecting element and the contact-securing insert are insertable into the first receiving space irrespective of a radial orientation of the electrical connecting element, the radial orientation of the electrical connecting element being fixed with the contact-securing insert arranged and latched in the first receiving space.

19. The connector of claim 17, wherein the conductive electrical connecting element includes a contact sleeve adapted to connect to a contact pin, and an electrical contact adapted to connect to an electrical conductor, the retaining element fixedly capturing the electrical contact.

20. A method for assembling an electrical plug connector comprising the steps of:

connecting an electrical conductor to an electrical contact of an electrical connecting element;

plugging together a retaining element with the electrical connecting element in such a way that the retaining element at least partially engages around the electrical connecting element;

arranging the electrical conductor in a through-opening of a contact-securing insert, the electrical conductor guided laterally into the through-opening via a groove running parallel thereto;

inserting the electrical connecting element, the retaining element, the electrical conductor and the contact-securing insert into a housing through a first opening thereof, the electrical connecting element insertable into the housing irrespective of its radial orientation, the retaining element at least partially abuts an inner wall of a through-opening of the contact-securing insert;

latching the contact-securing insert within a first receiving space of the housing, wherein the electrical connecting element and the retaining element are fixed in an axial and a radial direction within the housing with the contact-securing insert in the latched position.

21. A connector, comprising:

a housing defining a first receiving space, a second receiving space, and a first stop formed between the first receiving space and the second receiving space;

a conductive electrical connecting element arranged in the second receiving space, including:

a contact sleeve adapted to connect to a contact pin; and an electrical contact adapted to connect to an electrical conductor;

a retaining element engaging around at least portions of the electrical connecting element; and a contact-securing insert defining a through-opening and a second stop formed inside the through-opening, the contact securing insert is arranged in the first receiving space and fixes the electrical connecting element and the retaining element within the housing in an axial direction of the electrical connecting element, the retaining element abutting the second stop and fixing the electrical connecting element within the housing in the axial direction.

* * * * *